United States Patent [19]

O'Meara

[11] Patent Number: 5,126,876
[45] Date of Patent: Jun. 30, 1992

[54] MASTER OSCILLATOR POWER AMPLIFIER WITH INTERFERENCE ISOLATED OSCILLATOR

[75] Inventor: Thomas R. O'Meara, Malibu, Calif.

[73] Assignee: Hughes Aircraft Company, Los Angeles, Calif.

[21] Appl. No.: 663,277

[22] Filed: Feb. 28, 1991

Related U.S. Application Data

[63] Continuation of Ser. No. 439,212, Nov. 20, 1989, abandoned.

[51] Int. Cl.$^5$ .............................................. H01S 3/098
[52] U.S. Cl. .................................. 359/338; 359/334; 372/21; 372/29
[58] Field of Search ............................... 359/338, 334

[56] References Cited

U.S. PATENT DOCUMENTS

| | | | |
|---|---|---|---|
| 4,720,160 | 1/1988 | Hicks | 372/94 |
| 4,794,345 | 12/1988 | Linford et al. | 330/4.3 |
| 4,902,980 | 2/1990 | O'Meara | 330/4.3 |

OTHER PUBLICATIONS

O'Meara, T. R.; "Compensation of Laser Amplifier, Trains With Nonlinear Corrugation Techniques", Opt. Eng., vol. 21, #2, pp. 243–251, Apr. 1982. Abst. only provided.
"Laser interferometer with wavefront-reversing mirrors", N. G. Basov et al., Sov. Phys. JETP 52(5), Nov. 1980, pp. 847–851.
"Fidelity of Two-Beam Phase Locking in a Phase-Conjugate Mirror", G. A. Pasmanik, et al., Institute of Applied Physics, USSR Academy of Sciences, USSR, CLEO '89 Conference on Lasers and Electro-Optics, Apr. 24–28, 1989, QELS [1989 Quantum Electronics and Laser Science Conference, Apr. 24–28, 1989.

*Primary Examiner*—Nelson Moskowitz
*Attorney, Agent, or Firm*—V. D. Duraiswamy; W. K. Denson-Low

[57] ABSTRACT

A master oscillator power amplifier (MOPA) system which isolates the master oscillator (MO) from the return amplified beam by dividing the return beam into two components, introducing a phase shift between the components, and recombining the phase shifted beam components through constructive interference into an output beam directed away from the MO. A destructive interference return output is directed back towards the MO, but is held to a negligible level by making the phase shift approximately equal to an odd number of half-wavelengths at the return beam wavelength. In the preferred embodiment a stimulated Brillouin scattering phase conjugate mirror (PCM) is used to direct the amplified beam for a second amplification pass, while a Mach-Zender interferometer transmits the beam both before and after double amplification. The original beam is replicated after its first path through the interferometer by having the interferometer phase shift also equal an integral number of wavelengths at the input beam wavelength, prior to frequency shifting by the PCM.

8 Claims, 4 Drawing Sheets

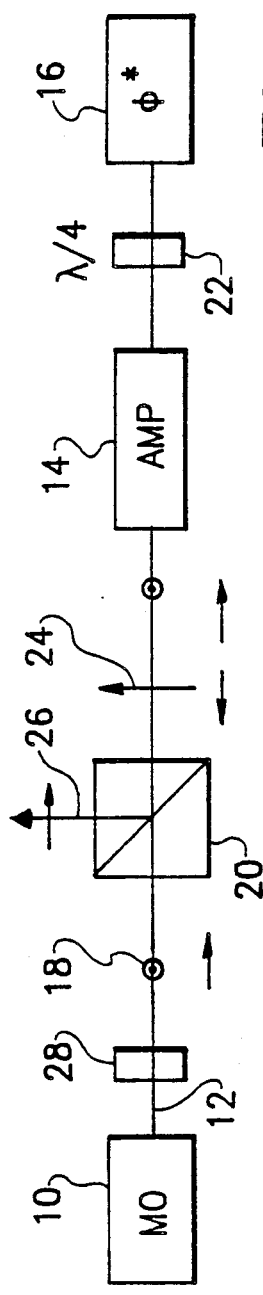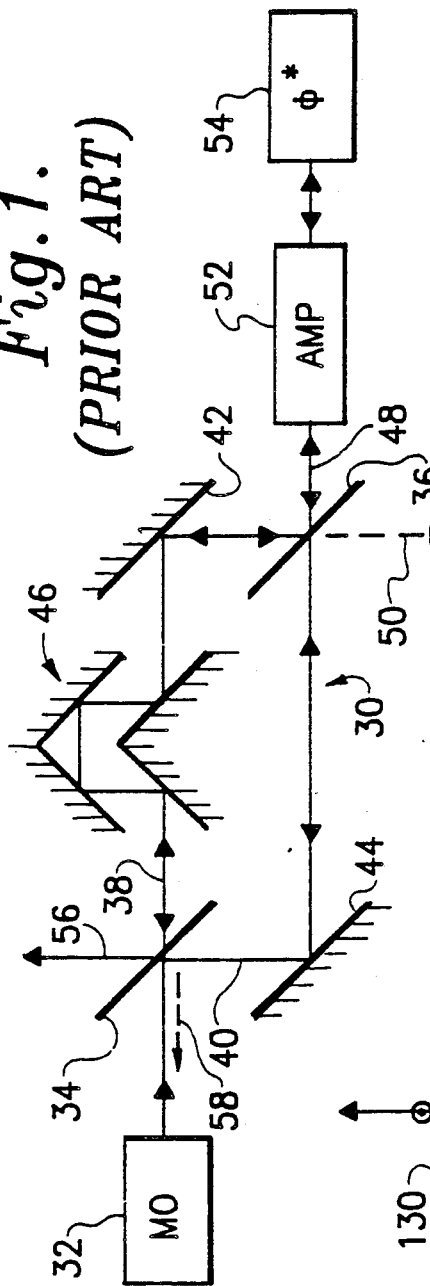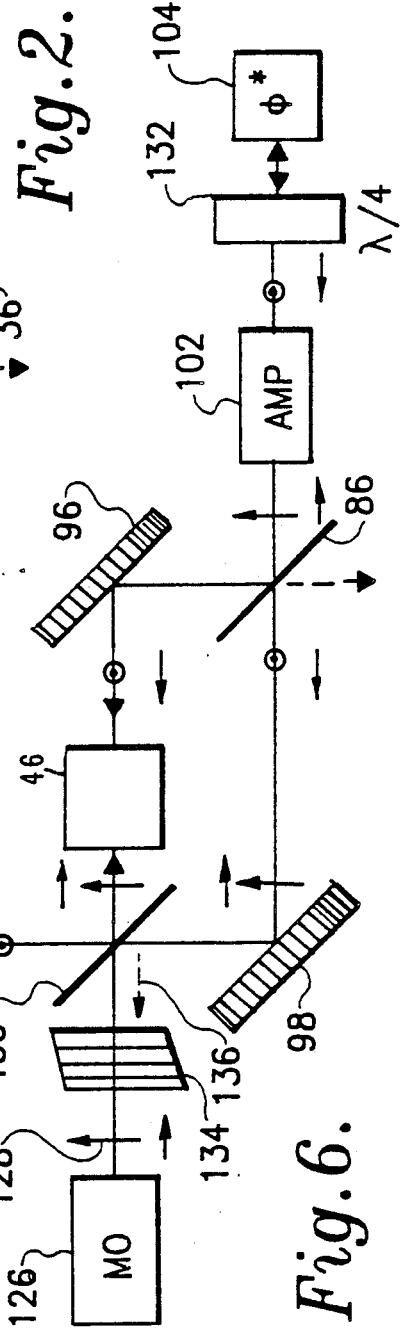

MASTER OSCILLATOR POWER AMPLIFIER WITH INTERFERENCE ISOLATED OSCILLATOR

GOVERNMENT RIGHTS

This invention was made with United States government support under Contract No. F29601-87-C-0029 awarded by the Department of the Air Force. The United States government has certain rights in this invention.

This is a continuation of application Ser. No. 07/439,212, filed Nov. 20, 1989, now abandoned.

BACKGROUND OF THE INVENTION

1. Field of the Invention

This invention relates to optical master oscillator power amplifiers (MOPAs), and more particularly to MOPAs in which an amplified return beam is isolated from the master oscillator which generated the input beam.

2. Description of the Related Art

MOPA laser systems are used to generate high power laser beams. Such systems are described in U.S. Pat. Nos. 4,734,911 to Bruesselbach and 4,757,268 to Abrams et al., both assigned to Hughes Aircraft Company, the assignee of the present invention.

A known MOPA system is shown in FIG. 1. A master oscillator 10 is provided in the form of one of several known lasers, using a gas-dye or solid-state laser medium to produce a pulsed laser beam 12. The laser beam is coupled into an optical amplifier 14, and the amplified beam is then forwarded to a phase conjugate mirror (PCM) 16. The latter element returns the beam with a wavefront reversal back through amplifier 14, where it is amplified a second time. Stimulated Brillouin scattering (SBS) and stimulated Raman scattering (SRS) PCMs have been employed for this purpose. Processing by the PCM and double passage through the amplifier results in a negation of amplifier-induced aberrations in the beam, in a known fashion. Examples of such aberrations are spatial thermal differences for a solid amplifier medium, and turbulence for a gaseous amplifier medium.

It is important that the twice-amplified beam be coupled out of the system without re-entering the master oscillator (MO). An optical polarization scheme has been used to achieve this isolation. The beam 12 emitted from the MO 10 is polarized, as indicated by the horizontal polarization symbol 18; the arrow below this symbol indicates the direction of beam travel. The polarized beam 12 is directed onto a polarization sensitive beam splitter 20, which transmits the polarized beam to amplifier 14. From there it is transmitted through a quarter-wave plate 22 to PCM 16, and reflected back through quarter-wave plate 22 for a second amplification. Quarter-wave plate 22 rotates the polarization of the conjugated wave by 90 on its return path from PCM 16; this rotated polarization is indicated by vertical vector arrow 24. The polarization sensitive beam splitter 20 deflects the vertically polarized return beam along an output path 26, which is directed away from the MO 10. This reflected beam constitutes the amplified output of the system. A magneto-optic isolator 28 may be placed in the output path 12 from MO 10 to block any horizontally polarized light remaining in the return beam, in case full polarization rotation has not been achieved.

A principal limitation of this type of system is that the presence of the polarization elements significantly limits the beam power that can be handled, and requires dual polarization operation of the power amplifiers. The diameter of the beams that can be accommodated is also quite restricted by the limited available size of quarter-wave plates. Magneto-optic isolators are also limited to low power regimes, and require bulky magnets.

SUMMARY OF THE INVENTION

The present invention overcomes the above limitations with a MOPA system that, in its pure form, eliminates the requirement for polarization transforming elements, and enables operation at much higher power levels and beam diameters. This is accomplished by taking an entirely new approach to isolating the return amplified beam from the MO.

The input beam from the MO is directed in a double pass through an optical amplifier, as previously. The beam frequency is also shifted between the first and second amplifying passes, preferably by an SBS PCM. After the second amplifying pass the beam is divided into two components, and a phase shift is introduced between the two components approximately equal to an odd number of half-wavelengths at the frequency shifted wavelength. The two return beam components are then recombined through a constructive interference that establishes an output path directed away from the MO.

In the preferred embodiment, the input beam from the MO is directed through a Mach-Zender interferometer which employs a pair of beam splitters to divide the beam into two components and then recombine the components via constructive/destructive interference. The constructive interference output goes through two amplification passes as described, and is returned along a reverse path back through the Mach-Zender interferometer. The interferometer introduces the desired phase shift so that the destructive interference output of the return beam (ideally of zero magnitude) is directed back towards the MO, while the constructive interference return beam output (ideally the full amplified beam power) is directed away from the MO. To maximize efficiency and ensure that the beam delivered from the interferometer to the amplifier is equal in intensity to the beam generated by the MO, the interferometer phase shift is also designed to approximately equal an integral number of wavelengths at the MO wavelength (before frequency shifting).

A hybrid implementation which combines the basic invention with the prior polarization rotation approach is also possible. While the hybrid system has beam power and size limitations similar to the prior art, it is more effective in isolating the MO from the return beam.

Further features and advantages of the present invention will occur to those skilled in the art from the following detailed description of preferred embodiments, taken together with the accompanying drawings, in which:

DESCRIPTION OF THE DRAWINGS

FIG. 1 is a block diagram of a prior MOPA system;

FIG. 2 is a block diagram of a "pure" implementation of the invention using a Mach-Zender interferometer;

FIG. 6 is a block diagram of a hybrid embodiment combining the basic features of the invention with a rotational polarization system.

DETAILED DESCRIPTION OF THE INVENTION

Figure 3:
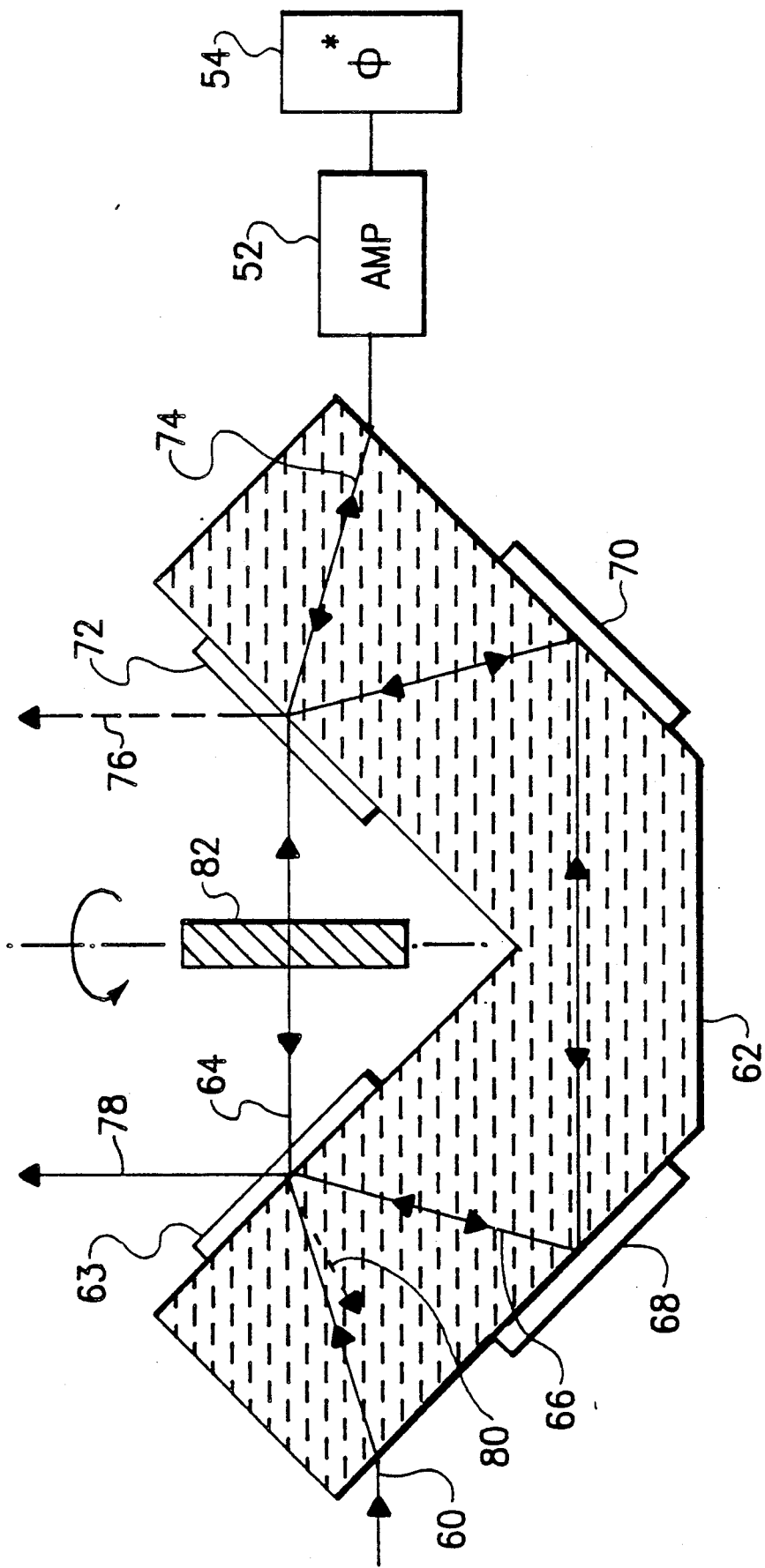
FIG. 3 is a variation of FIG. 2, in which the Mach-Zender interferometer is implemented with a glass block.

A basic form of the invention is illustrated in FIG. 2. It employs a Mach-Zender interferometer 30 which conditions both a laser beam from a conventional MO 32 and a return amplified beam such that the return beam is directed away from the MO. Mach-Zender interferometers are discussed in Born and Wolf, *Principles of Optics*, Pergamon Press, 5th Ed., 1975, pages 312-316. In general, they consist of a pair of beam splitters 34, 36, with one beam splitter 34 dividing an input beam into two components, and the other beam splitter 36 recombining the components into destructive and constructive interference outputs. The two beam components are directed along separate paths, with one of the paths often made longer than the other by a specified amount so that the two beam components can be out-of-phase by any desired degree at the second beam splitter 36.

In the implementation of FIG. 2, beam splitter 34 divides the input beam from MO 32 into two components along paths 38 and 40. The beam splitter is a 50/50 device so that the two beam components are equal in power and can recombine through constructive interference at beam splitter 36 to replicate the original input beam. The two beam components are directed by mirrors 42 and 44 onto beam splitter 36 at right angles to each other. The two beam paths 38 and 40 would be equal in length except for a path unbalance element 46 which adds to the effective length of path 38 without changing its direction. As shown, path unbalance element 46 can consist of a set of mirrors arranged to return the beam 38 to its original path after introducing an additional path length. The desired result is that the beam component passing beam splitter 36 along path 38 is out-of-phase with the beam component reflected from path 40. Other types of optical delay mechanisms could also be employed to obtain the desired phase difference.

By designing the path unbalance element 46 such that the beam components along paths 38 and 40 are relatively delayed with respect to each other at beam splitter 36 by approximately an integral number of wavelengths at the MO wavelength, the two beam components will undergo both constructive and destructive interference with each other at beam splitter 36. A constructive interference output which substantially replicates the original input beam from MO 32 will be produced along path 48, while a destructive interference output which is ideally zero will be produced along a second path 50 perpendicular to path 48.

The constructive interference output along path 48 is delivered to an optical amplifier 52, which amplifies the beam and transmits it to a frequency shifting reflection device, preferably implemented as an SBS PCM 54. A phase shifted conjugate beam is delivered from PCM 54 back to amplifier 52 for a second amplifying pass, and then enters the Mach-Zender interferometer 30 at beam splitter 36. The interferometer now operates in reverse from the input path. It splits the amplified return beam into two components, introduces a phase shift between the two, and beats them against each other at beam splitter 34.

A key element of the invention is that the optical path difference introduced by Mach-Zender interferometer 30 between the two return beam components is also coordinated with the frequency shift introduced by PCM 54 so that the return beam components recombine at beam splitter 34 into a constructive beam output which is directed away from the MO 32. This is accomplished by setting path unbalance element 46 such that, in addition to introducing approximately an integral number of wavelengths at the MO wavelength, the optical path difference between the two return components also approximately equals an odd number of half-wavelengths at the frequency shifted return beam wavelength. With this arrangement a constructive interference output will be delivered from beam splitter 34 along an output path 56 which is orthogonal to the original input beam path from MO 32, and thus does not enter the MO. A destructive interference output 58 from beam splitter 34 will be directed back towards the MO, but this destructive interference output is ideally zero. Thus, the amplified beam is successfully directed away from the MO without the use of any polarization shifting elements.

The positions of amplifier 52 and PCM 54 in the interferometer's constructive interference output path 48 shown in FIG. 2 are based upon the assumption that the optical path difference between the two beam components within the interferometer is approximately an integral number of wavelengths at the MO wavelength. The system would still operate if the phase shift is offset by an odd number of half-wavelengths at the MO wavelength. In this case the constructive and destructive interference outputs 48 and 50 would be reversed, and the amplifier 52 and PCM 54 would be positioned in the new constructive interference output path 50. Thus, any integral number of half-wavelengths at the MO wavelength can be used.

An SBS PCM is preferred for the frequency shift mechanism because of its high power capability, efficient conjugation operation, and high level frequency shift. With a frequency shift typically on the order of 2-10 GHz, an SBS PCM requires a reasonable unbalance length in the interferometer. 10 GHz corresponds to a wavelength of approximately 3 cm, whereas other types of PCMs produce a much lower frequency shift, and therefore require a much longer unbalance path in the interferometer.

FIG. 3 illustrates an alternate construction for the Mach-Zender interferometer. In this embodiment the MO beam 60 is directed into a shaped dielectric block 62 formed from a transparent material such as glass. The input beam 60 is divided into two equal components by a beam splitter 63, as before. In this embodiment, the phase differential between the two components is achieved by both a difference in path length, and by transmitting one of the components 64 through the air and the other component 66 through the higher refractive index dielectric.

Beam component 66 is reflected off mirrors 68 and 70 on the outer surface of dielectric block 62, and beats against beam component 64 at a second beam splitter 72. The difference in effective path lengths is again designed so that a constructive interference replica 74 of the original input beam 60 is transmitted to amplifier 52 and PCM 54, with an ideally zero destructive interference output 76 directed out of the system.

As with the system of FIG. 2, the interferometer of FIG. 3 is set up so that the amplified return beam is divided into two components which are shifted in phase with respect to each other by an odd number of half-wavelengths at the frequency shifted wavelength established by PCM 54. As a result, the two return components meet at beam splitter 63 and produce a constructive interference output 78 which is directed away from the original input beam 60, and an ideally zero destructive interference output 80 back along the original input beam path.

To tune the interferometer to the desired effective path length differential, a trimming mechanism such as a rotating flat 82 may be added in the path of the air beam component 64. In practice, the geometry of the dielectric block 62 could be selected to satisfy the requirement that the effective path differential equal an odd number of half-wavelengths at the frequency shifted wavelength. The system could then be fine-tuned by a rotation of optical flat 82 until the constructive interference output along path 74 replicated the input beam 60, thus satisfying the second requirement that the optical path difference approximately equal an integral number of wavelengths at the input beam wavelength.

Figure 4:
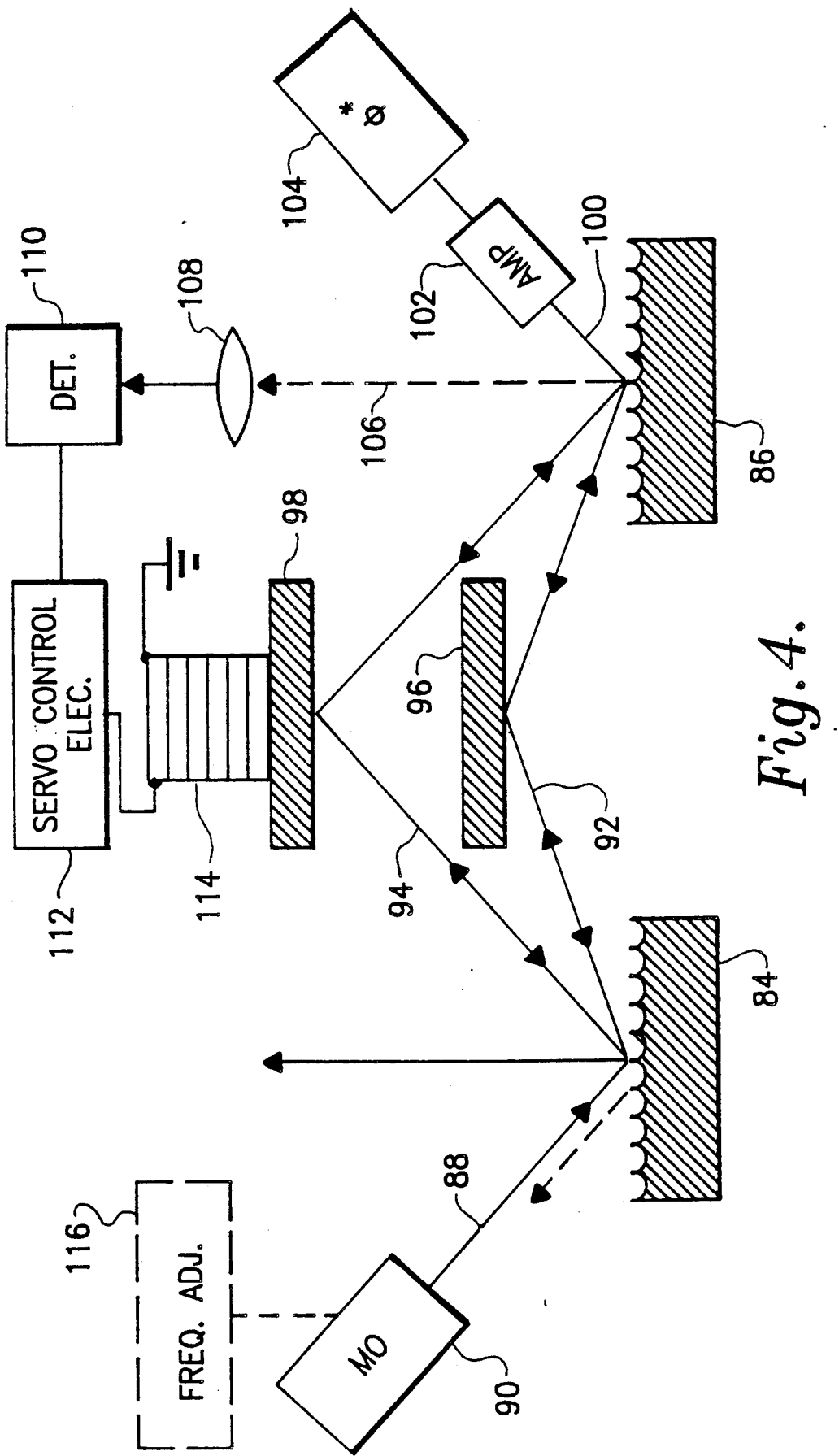
FIG. 4 is a block diagram of an alternate embodiment with diffraction grating beam splitters and illustrating a servo-control mechanism for trimming the interferometer.

To maintain proper operation in the presence of temperature, vibration or other perturbations, a servo control mechanism can be added to control the effective path length differential. Such a system is illustrated in FIG. 4, in which very high beam powers are accommodated by employing cooled diffraction grating beam splitters and combiners 84 and 86. The input beam 88 from MO 90 is divided into two components 92, 94 by beam splitter 84. The first component 92 is reflected off a fixed mirror 96 onto beam splitter 86, while the second beam component 94 is reflected off a moveable mirror 98 and onto beam splitter 86. The constructive interference output 1?0 is directed to amplifier 102 and SBS PCM 104, and returned back to the interferometer as in the other systems described above. The destructive interference output 106 from beam splitter 86 is focused by lens 108 onto an optical detector 110, which feeds a signal indicating the presence of detected optical radiation into an electrical servo control circuit 112. The servo controls a piezotransducer stack 114 which sets the position of mirror 98. By automatically adjusting the mirror position in a negative feedback loop until zero destructive interference output is detected by detector 110, the system can be trimmed to establish the desired phase differential between the beam components at beam splitters 84 and 86.

While an adjustment of the interferometer path length is the preferred trimming mechanism, trimming can also be accomplished by adjusting the frequency of MO 90. This is indicated in FIG. 4 by an optional frequency adjustment control mechanism 116. Changing the frequency of the MO beam changes its wavelength, and thus can be used to adjust the interferometer phase shift for given interferometer path lengths.

Figure 5:
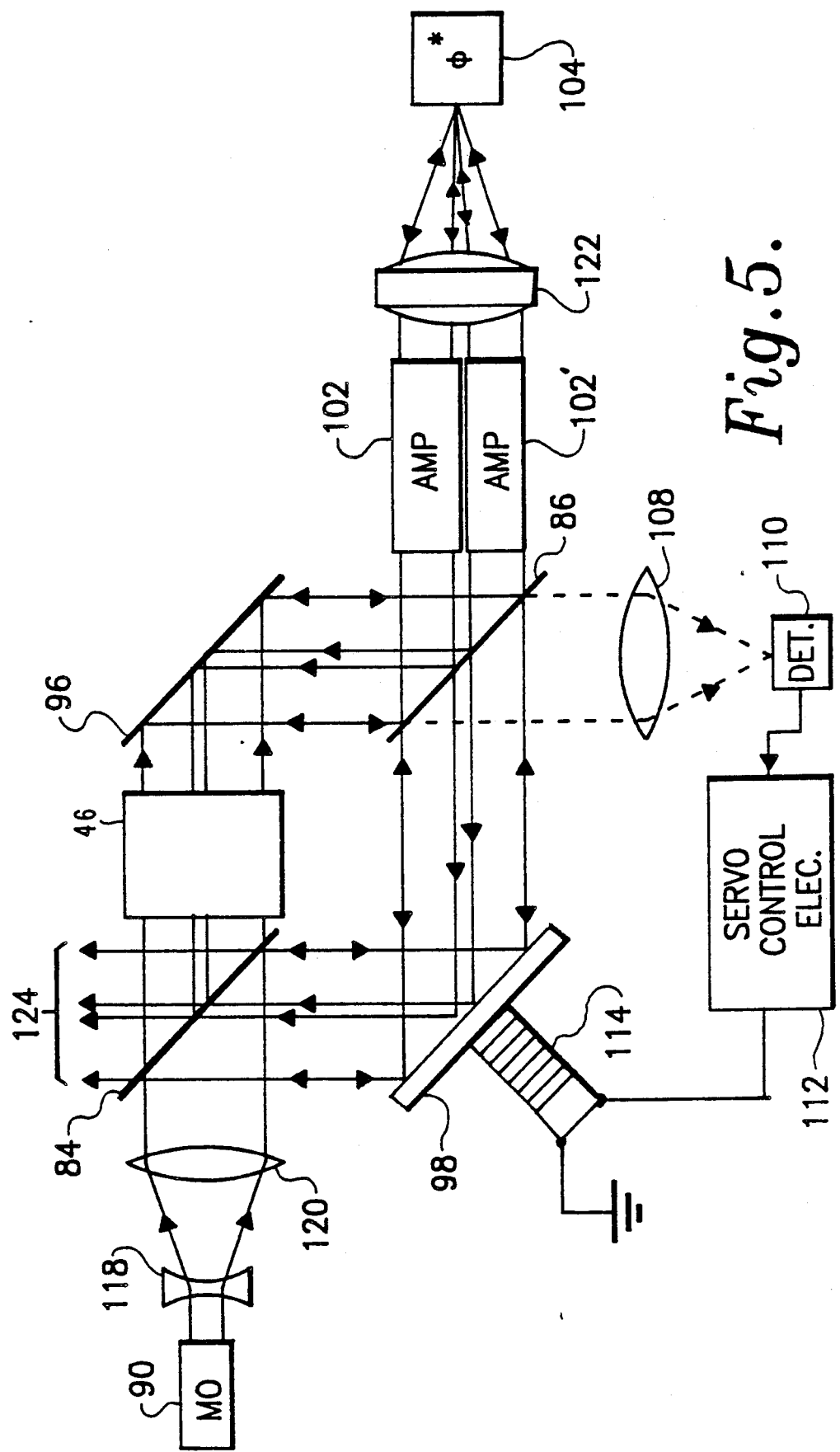
FIG. 5 is a block diagram of an embodiment of the invention employing an array of amplifiers.

The use of the invention for coherent beam combining and compensation of the outputs from a plurality of laser amplifiers serviced by a single MO, which is a primary application, is illustrated in FIG. 5. This system can be assumed to be similar to that shown in FIG. 4, and common elements are indicated by the same reference numerals. Because both the power capability and dimensions of a single optical amplifier are limited, an array of amplifiers 102' are employed. The beam from MO 90 is expanded through a diverging lens 118 and then collimated through converging lens 120 into the interferometer. There it is processed as described above, and a replica of the input beam is transmitted through amplifiers 102' for amplification. By breaking the beam down between separate amplifiers, a greater total power handling capability can be achieved.

The amplified beam is then focused onto PCM 104 by a converging lens 122. The phase shifted conjugate beam which is reflected back from PCM 104 follows a return path through the system analogous to the previous systems. The result is a high power amplified constructive interference system output beam 124 which is directed away from the MO 90.

A hybrid MOPA which combines the invention with the prior polarization rotation system can be used as an alternate to the servo control mechanism described above to assure that none of the amplified beam enters the MO. Such a system might be considered, for example, in case of any residual transmission of the amplified beam back into the MO because of interferometer unbalance, and for one reason or another a servo control mechanism is not desired. Such a system is illustrated in FIG. 6. Elements common to the systems of FIGS. 4 and 5 are again indicated by the same reference numerals. In this embodiment an MO 126 which produce a polarized output, indicated by polarization vector 128, is used. A polarization sensitive beam splitter 130 is employed as the input to the interferometer, while a quarter-wave plate 132 is positioned between amplifier 102 and PCM 104. A magneto-optic isolator or a polarizer 134 between MO 126 and polarization sensitive beam splitter 130 prevents any optical radiation which may exist in the destructive interference return output beam 136 from entering the MO. This embodiment adds an extra degree of isolation to the MO, at the cost of limited beam power and dimensions.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A master oscillator power amplifier (MOPA) system, comprising:
    a master oscillator (MO) for generating an input coherent optical beam along an input path,
    an optical amplifier positioned to amplify said beam in a first amplifying pass,
    a phase conjugate mirror (PCM) positioned to receive the amplified beam and to direct a phase conjugate of the input beam back to said amplifier for a second amplifying pass, said phase conjugate beam being shifted from the input beam by a predetermined frequency shift,
    interferometer means positioned in the return beam path between said optical amplifier and said MO, said interferometer means producing constructive and destructive interference return beam outputs with said destructive return beam output directed back towards the MO and said constructive return beam output directed along an output path, wherein said interferometer means is also positioned along said input beam path and produces constructive and destructive interference input beam outputs, with the constructive input beam output directed into said optical amplifier for said first amplifying pass, a said interferometer having a path length differential approximately equal to (a) an integral number of wavelengths at the MO wavelength, and (b) an odd number of half-wavelengths at the phase conjugated return beam wavelength, and including servo control means for controlling effective path length differential, wherein said servo control means comprises:

at least a first cooled diffraction grating beam splitter for dividing the input coherent optical beam from said master oscillator into two components, at least a second cooled diffraction grating beam splitter, a first reflecting means which is fixed for reflecting one of said two components onto said second cooled diffraction grating beam splitter, a second reflecting means which is moveable for reflecting the other of said two components onto said second cooled diffraction grating beam splitter for combining with said first component, detector means for detecting destructive interference output from said second cooled diffraction grating and generating a signal, and control means for adjusting the position of said second reflecting means in response to the detector signal.

2. The MOPA of claim 1, further comprising trimming means for adjusting the input beam frequency to trim the number of wavelengths in said unbalance path.

3. The MOPA system of claim 1, said PCM comprising a stimulated Brillouin scattering PCM.

4. The MOPA system of claim 1, said optical amplifier comprising a spatial array of a plurality of optical amplifier sections, and further comprising means for expanding the beam from the MO so that it is incident upon said plurality of optical amplifier sections, and means for contracting the beam after the first amplifying pass onto said PCM.

5. A master oscillator power amplifier (MOPA) system, comprising:

a master oscillator (MO) for generating an input coherent optical beam along an input path, a first beam splitter positioned in said input path for splitting the input beam into first and second components, a second beam splitter, beam directing means directing said first and second input beam components between said first and second beam splitters along respective first and second beam paths that differ in effective length by approximately an integral number of wavelengths at the MO wavelength, whereby said first and second beam components interact at the second beam splitter to produce a constructive interference beam, an optical amplifier positioned in the path of said constructive interference beam to amplify said beam in a first amplifying pass, a phase conjugate mirror (PCM) positioned to receive the amplified beam and to direct a phase conjugate of the amplified beam back to said amplifier for a second amplifying pass, said phase conjugate beam being shifted from the input beam by a predetermined frequency shift and being directed from said amplifier back to said second beam splitter, said second beam splitter splitting the phase conjugate beam into first and second components directed by said beam directing means back to said first beam splitter along said first and second beam paths, respectively, said first and second beam paths differing in effective length by approximately an odd number of half-wavelengths at the phase conjugate beam wavelength, whereby said phase conjugate beam components undergo destructive interference at said first beam splitter back along said input path towards the MO, and constructive interference to produce an output beam along an output path which does not enter the MO, and trimming means for adjusting the effective path length differential between first and second beam paths, wherein said beam directing means comprises:

a dielectric block formed from a transparent material positioned in said input path so that one of said first or second input beam components is transmitted through said dielectric block, a plurality of mirrors positioned for reflecting said input beam component transmitted through said dielectric block towards said second beam splitter.

6. The power amplifier of claim 5, said PCM comprising a stimulated Brillouin scattering PCM.

7. The power amplifier of claim 5, said optical amplifier comprising a spatial array of a plurality of optical amplifier sections, and further comprising means for expanding the input beam so that it is incident upon said plurality of optical amplifier sections, and means for contracting the beam after the first amplifying pass onto said PCM.

8. The power amplifier of claim 5, further comprising means for polarizing the input beam prior to said first beam splitter, and means located between said second beam splitter and said PCM for rotating the beam polarization to a cross-polarization orientation, said second beam splitter being polarization sensitive to direct components of said phase conjugate beam having said cross-polarization along said output path.

* * * * *